Aug. 16, 1938.　　　　A. C. PATEY　　　　2,126,806
AMUSEMENT DEVICE
Filed Nov. 1, 1934　　　　2 Sheets-Sheet 1

INVENTOR
ADELAIDE C. PATEY
BY
Clark & Ott
ATTORNEYS

Aug. 16, 1938.  A. C. PATEY  2,126,806
AMUSEMENT DEVICE
Filed Nov. 1, 1934   2 Sheets-Sheet 2
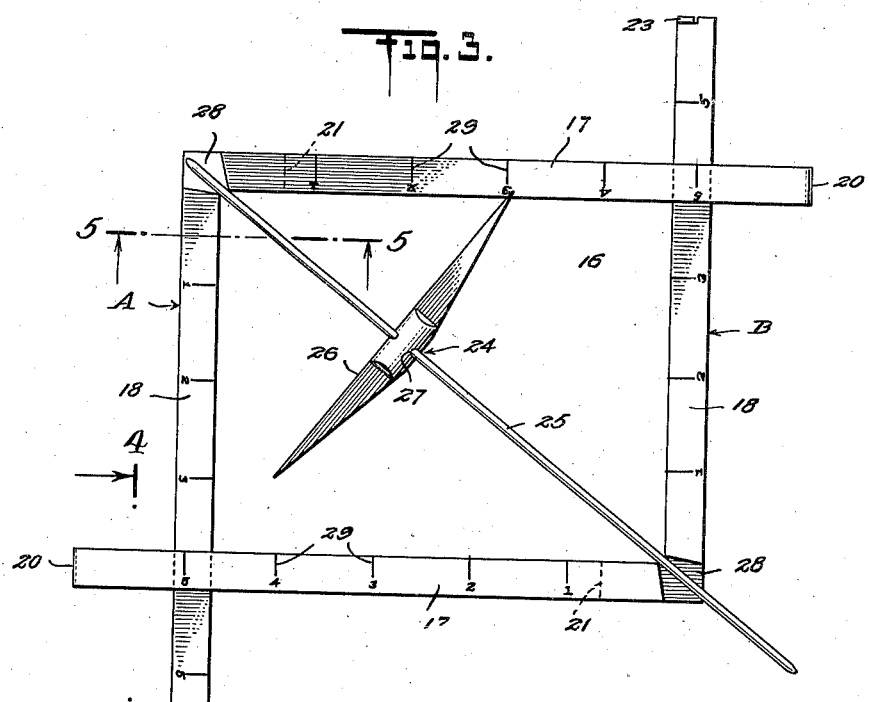
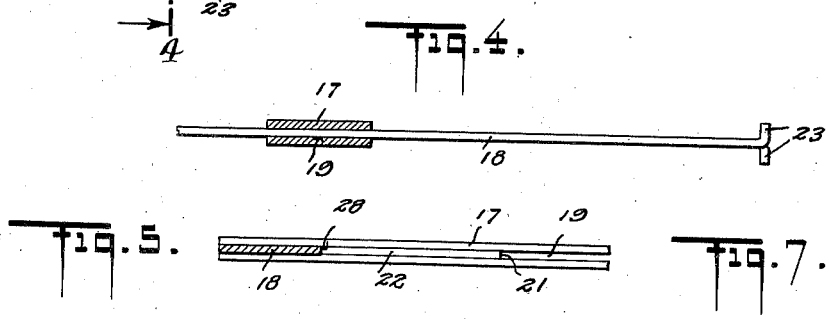
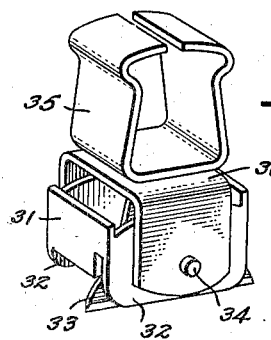 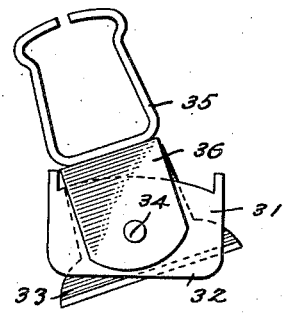
INVENTOR
ADELAIDE C. PATEY
BY
*Clark & Ott*
ATTORNEYS Patented Aug. 16, 1938

2,126,806

UNITED STATES PATENT OFFICE 2,126,806

AMUSEMENT DEVICE

Adelaide C. Patey, Bedford Hills, N. Y.

Application November 1, 1934, Serial No. 750,941

3 Claims. (Cl. 35—26)

This invention relates to games or amusement devices and refers more particularly to a device which is especially designed for the entertainment of adults or children, while possessing a certain educational value by teaching the participants to develop their powers of imagination and suggestion along artistic lines.

The invention broadly comprehends a device of the indicated character including a sheet or equivalent means having a surface bearing a nondescript drawing or design printed or otherwise inscribed thereon, together with finder means for segregating or selectively framing one or more portions of the area of said drawing or design so as to suggest a picture or pictures lying within the confines of said portion or portions so segregated or framed.

The invention more particularly includes in combination with a nondescript drawing or design of an overlay having one or more transparent areas of lesser size than the drawing or design and adapted to be selectively arranged with reference thereto in order to locate and expose one or more portions thereof which suggest an artistic composition.

The invention further provides in combination with a nondescript drawing or design, of an alternate means for locating and segregating or framing a portion of the drawing or design for the purpose specified, which means consists of a pair of frame members adapted to be adjusted with reference to each other and selectively positioned upon the drawing or design.

One of the principal aims of the invention is to provide means by virtue of which art students or others are taught to recognize artistic subjects or compositions, and to correctly position the finder means with reference to the locus or focal portion of the segregated area of the picture or design, whereby a nondescript design may thus be resolved into a number of artistic subjects or compositions by the participant or student and the locus or focal portion of the picture located and correctly placed in relation to the size or extent of the composition.

The invention further includes an implement for facilitating the cutting out of the pictures or compositions framed by the finder means, which implement includes a cutter and is adapted to be moved along the frame members which serve as guides in the cutting operation.

With these and other objects in view, reference is now made to the following specification and accompanying drawings in which there is disclosed a preferred embodiment of the invention, while the claims cover variations and modifications thereof which fall within their scope.

In the drawings:

Fig. 3 is a plan view of an alternate form of finder means.

Fig. 4 is an enlarged fragmentary sectional view taken approximately on line 4—4 of the finder means illustrated in Fig. 3.

Fig. 5 is an enlarged fragmentary sectional view taken approximately on the line 5—5 of Fig. 3.

Fig. 6 is a perspective view of the implement for cutting out the area segregated by the finder means illustrated in Fig. 3.

Fig. 7 is a side view of the implement illustrating the manipulating means and cutter swung to one side.

Figure 1:
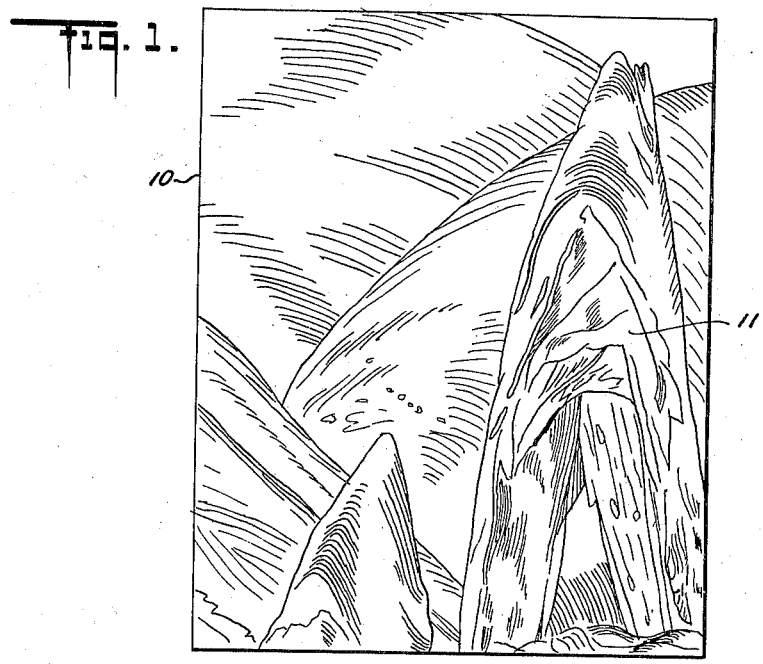
Fig. 1 is a base bearing on the surface thereof a nondescript drawing or design.

Referring to the drawings by characters of reference, 10 designates a base such as a sheet of paper or other equivalent means bearing on one surface thereof a nondescript drawing or design 11 which is painted, printed or otherwise inscribed thereon. In the instant embodiment, the drawing or design 11 is a painting which is made by applying water color to the base 10 and then wiping the wet color with a portion of the hand or arm to produce a plurality of color areas having lines or streaked formations extending in angular relation and forming an indiscriminate or nondescript picture or design.

The game or amusement device may consist of a set of such drawings or designs 11, each of which is of a nondescript character but which differ from each other in formation. In carrying out the invention, means is provided by which the participant, such as an art student, may selectively locate or segregate the portions of the drawing or design 11 so as to suggest a variety of artistic subjects or compositions lying within the confines of the portion or portions segregated.

One of the means provided for this purpose is an overlay 12 which may consist of a sheet of material having one or more window openings such as indicated by the reference characters 13, 14 and 15 provided in the overlay by coating the same with a collodion composition or equivalent substance to render the same transparent, while the remainder of the overlay is preferably opaque so as to block out the unframed portions of the drawing or design 11. The overlay 12 is adapted to be superimposed upon the surface of the base 10 bearing the drawing or design 11 and may be shifted about or arranged thereon in any desired manner by the participant until one or more areas of the drawing or design 11 is located which suggests artistic compositions.

Figure 2:
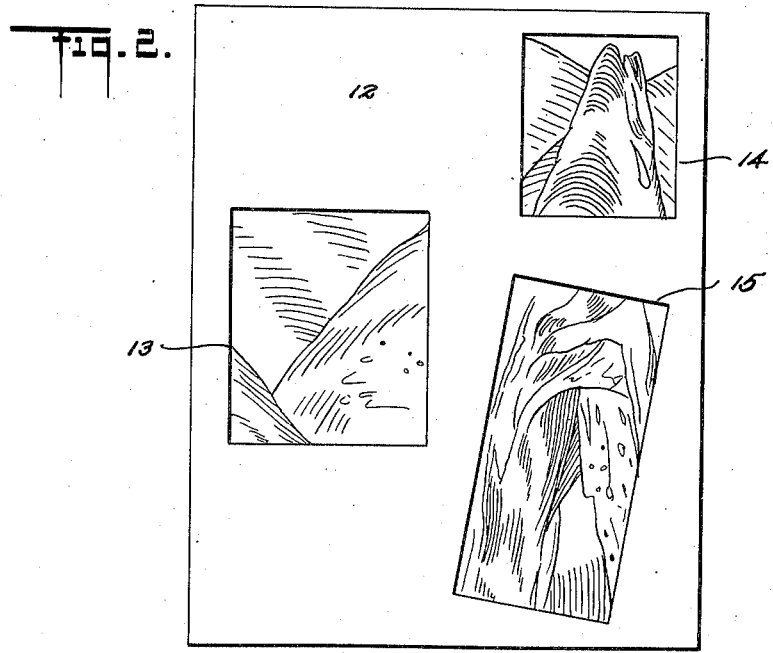
Fig. 2 is a similar view with the overlay in superimposed position thereon serving as a means for framing or segregating a portion or portions of the design or drawing forming an artistic subject or composition.

As shown in Fig. 2, the window openings 13, 14 and 15 are so arranged as to illustrate several views or compositions in the drawing or design illustrated in Fig. 1, the area framed by the window opening 13 suggesting a valley scene, while that formed by the window opening 14 suggesting a mountain crag or peak, and that formed by the window opening 15, when viewed from the left side, suggesting an underground cavern. While the overlay 12 thus illustrates the manner in which the same is adapted to be used, it may also be employed to selectively locate artistic subjects or compositions in the remaining drawings or designs 11 constituting a game set.

In place of the overlay 12, an alternate form of finder means designated generally by the reference character 16 may be employed to segregate portions of the drawing or design 11, which suggests to the participant an artistic subject or composition. The finder means 16 comprises a pair of frame members A and B, each consisting of a pair of angularly related legs 17 and 18. Each of the legs 17 is doubled upon itself or otherwise formed to provide a longitudinally disposed guide slot 19 extending inwardly from the bight 20 at the outer free end thereof to a shoulder 21 formed by a spacer 22.

The leg 18 of each of the frame members is slidable in the guide slot 19 of the other frame member and has at its free end an offset to provide oppositely disposed abutments 23 which prevent complete separation of the frame members, while permitting relative movements therebetween so as to form quadrilaterals of varying sizes by means of which the participants are enabled, after segregating the subject or composition, to correctly frame the same in relation to its size or extent.

In order to facilitate the proper framing of the subject or composition, a positioning means 24 is provided for determining the correct position of the frame members with reference to the locus or focal portion of the segregated area of the picture or design. The positioning means 24 comprises a rod 25 adapted to be superimposed upon the finder means in diagonal spanning relation thereto from opposite corners thereof and an index pointer 26 which is apertured as at 27 to receive the rod 25 therethrough so as to mount the same on the rod for sliding movement on an axis at right angles thereto. The frame members A and B are each provided with an outwardly flared recess 28 on the upper face thereof at the juncture of the legs 17 and 18 and in which recesses the opposite ends of the rod 25 are arranged to hold it in diagonal spanning relation to the finder means so as to permit sliding movement of the pointer 26 on the rod 25 and sliding movement of the rod 25 with reference to the frame members when the frame members are adjusted with reference to each other for forming different sized quadrilaterals.

Having ascertained the locus or focal portion of the picture or composition, the index pointer 26 at its juncture with the rod 25 is superimposed upon the locus or focal portion of the picture or composition and the frame members A and B are then adjusted to provide a size of quadrilateral corresponding to the size and shape of the subject or composition, by employing the index pointer 26 as a gauge to align therewith a corner formed by the intersection of the legs 17 of one frame member with the leg 18 of the other frame member.

The legs 17 and 18 of the frame members A and B may be provided with graduations 29 spaced equidistantly apart so as to facilitate the position of the opposite legs of the frame members in parallel relation to each other.

In order to provide means for cutting out the picture or composition framed by the finder means 16, an implement 30 is utilized which includes a slide 31 having depending longitudinally extending side flanges 32 adapted to straddle the legs 17 and 18 for guided sliding movement thereover. A cutting blade 33 is pivotally mounted on a pin 34 extending transversely of the slide and said blade has secured thereto for rocking movement therewith, a manipulating handle 35 having a bifurcated yoke portion 36. This mounts the blade on the slide so as to permit of its rocking movement to dispose the cutting edge of the blade at an inclination to the surface of the base 10 bearing the picture.

What is claimed is:

1. In a device of the character set forth, a finder including a pair of relatively slidable frame members each having a pair of angularly disposed legs adapted to be adjusted to define quadrilaterals of varying sizes, said frame members each having a recessed portion at the juncture of the legs thereof, a rod slidably associated with the recessed portions and a pointer slidable on the rod and having its axis extending at right angles to the axis of the rod.

2. In a device of the character described, a pair of relatively slidable angular frame members for selectively framing a portion of a surface bearing a design so as to suggest a composition or subject, a rod disposed obliquely to the frame members having a pointer for adjustment relative to the frame members for locating the said frame members with reference to a focal point of the composition or subject selected, and means on the frame members for receiving and holding the first means.

3. In a device of the character described, a pair of frame members, said frame members each including a pair of angularly disposed legs, one leg of each frame member being longitudinally slotted to slidably receive the remaining leg of the other frame member, a rod extending from the juncture of the legs of one frame member to the juncture of the legs of the other frame member having a pointer for adjustment relative to the frame members for locating said frame members with reference to a design composition to be framed thereby, and means on the frame members for receiving and holding the first means.

ADELAIDE C. PATEY.